United States Patent
Noguchi et al.

(10) Patent No.: US 9,906,079 B2
(45) Date of Patent: Feb. 27, 2018

(54) POWER SUPPLY CIRCUIT

(71) Applicant: Renesas Electronics Corporation, Kawasaki-shi (JP)

(72) Inventors: Koichiro Noguchi, Kawasaki (JP); Koichi Nose, Kawasaki (JP); Yoshifumi Ikenaga, Kawasaki (JP); Yoichi Yoshida, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 613 days.

(21) Appl. No.: 14/523,873

(22) Filed: Oct. 25, 2014

(65) Prior Publication Data
US 2015/0180239 A1    Jun. 25, 2015

(30) Foreign Application Priority Data
Dec. 19, 2013    (JP) .................... 2013-262376

(51) Int. Cl.
*H02J 17/00* (2006.01)
*H02J 50/20* (2016.01)
(Continued)

(52) U.S. Cl.
CPC .......... *H02J 50/20* (2016.02); *G05F 1/67* (2013.01); *H02J 17/00* (2013.01); *H02J 50/40* (2016.02);
(Continued)

(58) Field of Classification Search
CPC .................................................. H02J 17/00
(Continued)

(56) References Cited

U.S. PATENT DOCUMENTS

| 4,323,962 A * | 4/1982 | Steigerwald .......... H02M 7/217 307/34 |
| 2010/0181963 A1* | 7/2010 | Schreiber ................ H02J 7/022 320/108 |

(Continued)

FOREIGN PATENT DOCUMENTS

| JP | 8-237063 A | 9/1996 |
| JP | 2011-188733 A | 9/2011 |

OTHER PUBLICATIONS

Japanese Office Action dated Jul. 18, 2017, with an English translation.

*Primary Examiner* — Joseph Chang
(74) *Attorney, Agent, or Firm* — McGinn I.P. Law Group, PLLC.

(57) ABSTRACT

There is a problem in the prior semiconductor devices that energy recovery efficiency is low. According to one embodiment of the present invention, a power supply circuit includes an alternating-current signal synthesis unit including a plurality of alternating-current coupling elements having primary sides to which respective input alternating-current signals are input and secondary sides connected in series with each other, and a control circuit that outputs an input selection signal specifying a combination of the input alternating-current signals to be synthesized. The control circuit generates the input selection signal so as to maximize the output alternating-current signal synthesized by the alternating-current synthesis signal unit.

17 Claims, 14 Drawing Sheets

(51) Int. Cl.
*H02J 50/40* (2016.01)
*G05F 1/67* (2006.01)
*H02M 7/217* (2006.01)
*H02M 1/00* (2006.01)

(52) U.S. Cl.
CPC .... *H02M 7/217* (2013.01); *H02M 2001/0003* (2013.01); *Y10T 307/549* (2015.04)

(58) Field of Classification Search
USPC .......................................................... 307/52
See application file for complete search history.

(56) References Cited

U.S. PATENT DOCUMENTS

2011/0157945 A1* 6/2011 Malinin .................. H01F 27/40
363/127
2011/0199028 A1 8/2011 Yamazaki et al.

* cited by examiner

WHEN n=4 AND PHASE OF ALTERNATING-CURRENT SIGNAL OUTPUT FROM ALTERNATING-CURRENT SIGNAL SOURCE PS2 IS SHIFTED FROM PHASES OF OTHER ALTERNATING-CURRENT SIGNALS

POWER SUPPLY CIRCUIT

CROSS-REFERENCE TO RELATED APPLICATIONS

This application is based upon and claims the benefit of priority from Japanese patent application No. 2013-262376, filed on Dec. 19, 2013, the disclosure of which is incorporated herein in its entirety by reference.

BACKGROUND

The present invention relates to a power supply circuit, and for example, to a technique of using ambient radio signals as an alternating-current power supply and generating a direct-current power supply from the alternating-current power supply.

In recent years, a great deal of attention has been focused on efficient use of energy. One of the methods for efficiently using energy is an energy recovery technique. One example of the energy recovery techniques is disclosed in Japanese Unexamined Patent Application Publication No. 8-237063.

Japanese Unexamined Patent Application Publication No. 8-237063 discloses an output synthesis circuit including transformers formed of a plurality of unit transformers including primary windings to which outputs of high-frequency power amplifiers are added and secondary windings directly connected to each other, the secondary windings of the transformers being connected in parallel.

SUMMARY

However, there is a problem in the technique disclosed in Japanese Unexamined Patent Application Publication No. 8-237063 that, when there is a phase shift in the alternating-current signals to be synthesized, power of an alternating-current signal obtained by synthesis is greatly reduced. The other problems to be solved and the novel features of the present invention will become apparent from the following description of the specification and the accompanying drawings.

According to one embodiment, a power supply circuit includes an alternating-current signal synthesis unit including a plurality of alternating-current coupling elements having primary sides to which respective input alternating-current signals are input and secondary sides connected in series with each other, and a control circuit that outputs an input selection signal specifying a combination of the input alternating-current signals to be synthesized, and generates the input selection signal so as to maximize the output alternating-current signal synthesized by the alternating-current synthesis signal unit.

Note that a method and a system by which the circuit according to the above embodiment is replaced, and a program for causing a computer to execute the processing of a device or a part of the processing of the device are also effective as aspects of the present invention.

BRIEF DESCRIPTION OF THE DRAWINGS

The above and other aspects, advantages and features of the present invention will be more apparent from the following description of certain embodiments taken in conjunction with the accompanying drawings, in which.

DETAILED DESCRIPTION

Figure 1:
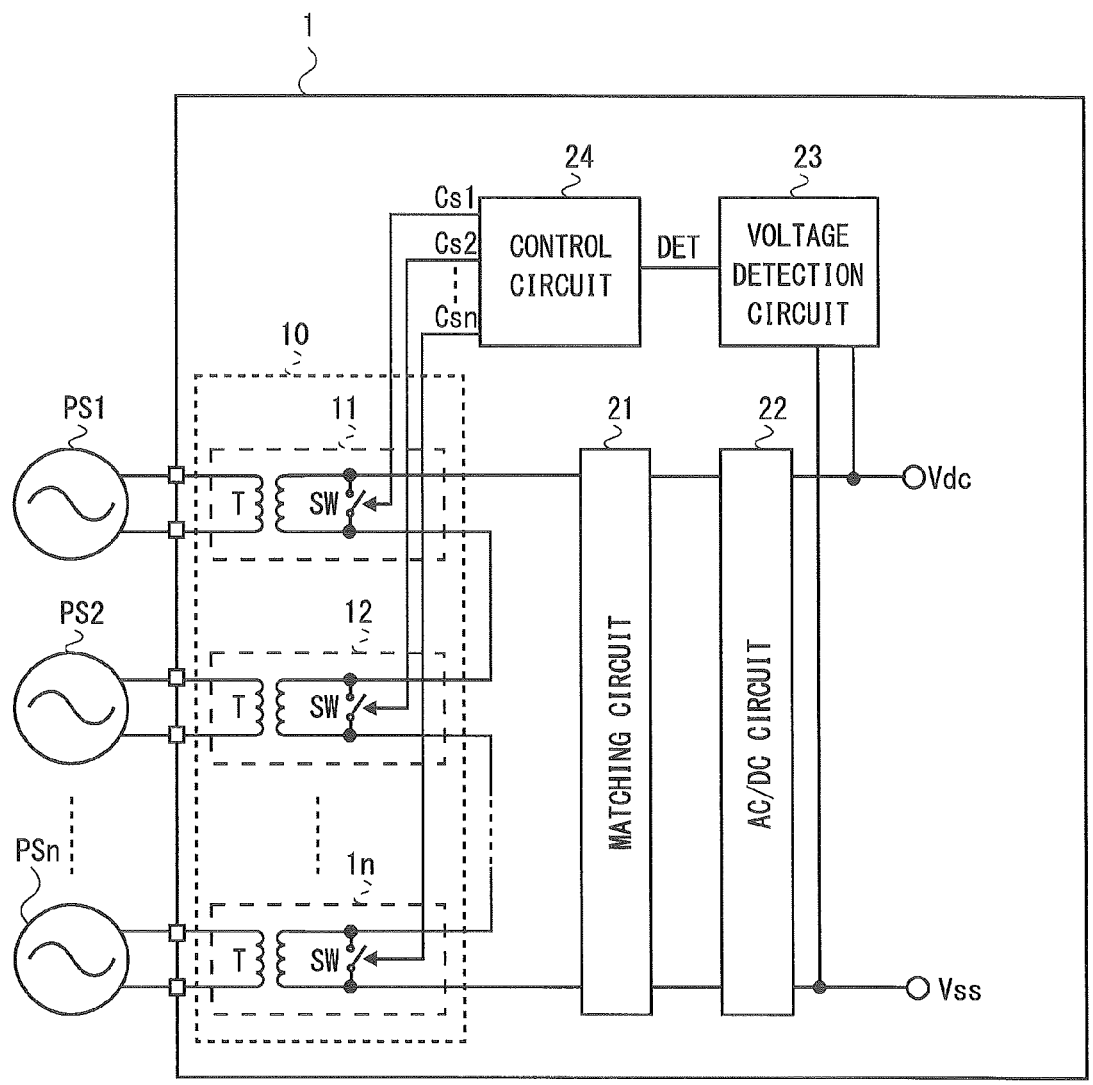
FIG. 1 is a block diagram of a semiconductor device according to a first embodiment.

For the sake of clarification of the following description, it and the drawings are partially omitted and simplified as needed. Further, each element shown in the drawings as functional blocks that perform various processing can be formed of a CPU, a memory, or other circuits in hardware, and can be implemented by a program or the like loaded to the memory in software. Therefore, it should be understood by one of ordinary skilled in the art that these functional blocks can be implemented in various ways only by hardware, software, or a combination thereof, and should not be limited to any one of them. Throughout the drawings, the same components are denoted by the same reference symbols, and overlapping descriptions will be omitted as needed.

Further, the above program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

FIG. 1 shows a block diagram of a semiconductor device 1 according to a first embodiment. The semiconductor device 1 according to the first embodiment receives, as input alternating-current signals, reception signals generated through an antenna or the like that receives radio signals. In summary, the semiconductor device 1 recovers energy attributed to radio waves propagating through space. Further, in the semiconductor device 1, outputs of a plurality of alternating-current signal sources (e.g., alternating-current signal sources PS1 to PSn (n is an integer indicating the number of alternating-current signal sources)) indicating alternating-current signals generated by a plurality of antennas are connected as input alternating-current signals. The semiconductor device 1 includes a power supply circuit that generates a direct-current power supply voltage used inside the semiconductor device 1 based on the plurality of input alternating-current signals.

In FIG. 1, circuit blocks other than the power supply circuit that operates by the internal power supply voltage generated by the power supply circuit of the semiconductor device 1 are not shown. Further, in the following description, an example in which the circuit blocks other than the alternating-current signal sources are formed on one semiconductor substrate will be described. However, these components are implemented by external elements as appropriate depending on the characteristics of the circuit blocks or elements such as an alternating-current coupling element.

As shown in FIG. 1, the semiconductor device 1 according to the first embodiment includes an alternating-current signal synthesis unit 10, a matching circuit 21, an AC/DC conversion circuit 22, a voltage detection circuit 23, and a control circuit 24.

The alternating-current signal synthesis unit 10 synthesizes the plurality of input alternating-current signals to output the synthesized signal as an output alternating-current signal. The alternating-current signal synthesis unit 10 synthesizes the input alternating-current signals to be synthesized specified by an input selection signal to output the output alternating-current signal. In the alternating-current signal synthesis unit 10 according to the first embodiment, the input alternating-current signals which are not the target of synthesis are interrupted based on the input selection signal, to exclude the input alternating-current signals which are not the target of synthesis from the target of synthesis. In FIG. 1, the control circuit 24 outputs input selection signals Cs1 to Csn as input selection signals.

Further, the alternating-current signal synthesis unit 10 includes alternating-current coupling parts 11 to 11n. The alternating-current coupling parts 11 to 1n are provided to correspond to the input alternating-current signals. The alternating-current coupling parts 11 to 1n each include an alternating-current coupling element (e.g., transformer T) and an input selection switch SW. The transformers T include primary-side input terminals to which the respective input alternating-current signals are input and secondary-side terminals connected in series with each other. Further, the input selection switches SW short-circuit or open the two primary-side terminals or the two secondary-side terminals of the respective alternating-current coupling elements according to the input selection signals. In the alternating-current coupling parts 11 to 1n according to the first embodiment, the input selection switches are provided between the secondary-side terminals of the transformers T. In summary, in the first embodiment, the input selection switches are provided only in the secondary side.

In another aspect, when it is assumed that the plurality of input alternating-current signals include a first input alternating-current signal and a second input alternating-current signal, it can be considered that the alternating-current signal synthesis unit 10 includes a first alternating-current coupling part and a second alternating-current coupling part. In this case, the first alternating-current coupling part is one alternating-current coupling part selected from the alternating-current coupling parts 11 to 1n, and is an alternating-current coupling part different from the second alternating-current coupling part selected from the alternating-current coupling parts 11 to 1n.

The first alternating-current coupling part includes a first alternating-current coupling element (e.g., transformer T) provided to correspond to the first input alternating-current signal and a first input selection switch SW provided between a first output terminal and a second output terminal on the secondary side of a first transformer T. Further, the second alternating-current coupling part includes a second alternating-current coupling element (e.g., transformer T) provided to correspond to the second input alternating-current signal and a second input selection switch SW provided between the first output terminal and the second output terminal on the secondary side of the second transformer T.

The terminals provided on the respective secondary sides of the first transformer T and the second transformer T are connected in series. Further, each of the first input selection switch SW and the second input selection switch SW includes a secondary-side input selection switch SW which short-circuits or opens the first output terminal and the second output terminal on the secondary side of the corresponding transformer T.

Further, the alternating-current signal synthesis unit 10 outputs an output alternating-current signal from between the lowermost first output terminal and the uppermost second output terminal among the output terminals of the transformer connected in series.

The matching circuit 21 matches the impedance of the output alternating-current signal output from the alternating-current signal synthesis unit 10. The AC/DC conversion circuit 22 converts the output alternating-current signal into a direct-current voltage signal. The direct-current voltage signal has a voltage value between a ground voltage Vss and a direct-current voltage Vdc. Further, the AC/DC conversion circuit 22 outputs the direct-current voltage signal having a voltage value with the magnitude according to an amplitude level of the output alternating-current signal. The voltage detection circuit 23 detects the voltage of the direct-current voltage signal. The control circuit 24 generates input selection signals Cs1 to Csn which specify the combination of the input alternating-current signals to be synthesized by the alternating-current signal synthesis unit 10 so as to maximize the output alternating-current signal.

In the semiconductor device 1 according to the first embodiment, the combination of the input alternating-current signals to be synthesized specified by the input selection signals Cs1 to Csn output from the control circuit 24 in a normal state is performed as a part of operation configuration processing before an operation is started in the normal state. In the operation configuration processing, the control circuit 24 switches the combination of the input alternating-current signals to be synthesized by the alternating-current signal synthesis unit 10 by the input selection signals Cs1 to Csn. Further, the voltage detection circuit 23 detects the voltage of the direct-current voltage signal for each combination of the input alternating-current signals and outputs a voltage detection signal DET to the control circuit 24 every time the maximum value of the voltage value of the direct-current voltage signal is updated. The control circuit 24 then determines the combination of the input alternating-current signals which maximizes the voltage of the direct-current voltage signal according to the voltage detection signal DET, and outputs the input selection signal corresponding to the combination of the input alternating-current signals which maximizes the voltage of the direct-current voltage signal in the normal operation state.

Figure 2:
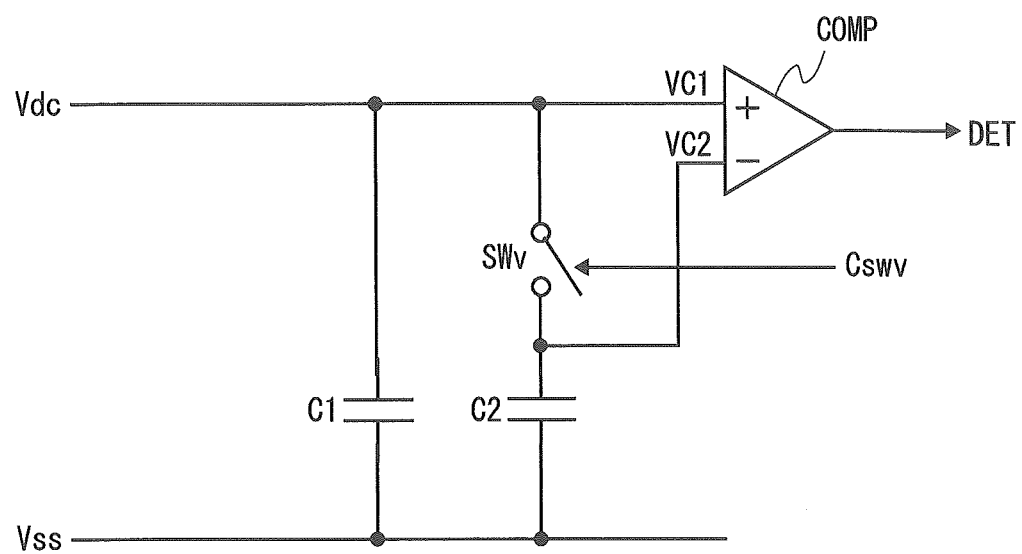
FIG. 2 is a block diagram of a voltage detection circuit according to the first embodiment.

First, a detailed configuration of the voltage detection circuit 23 will be described. FIG. 2 shows a block diagram of the voltage detection circuit 23 of the semiconductor device 1 according to the first embodiment. As shown in FIG. 2, the voltage detection circuit 23 includes capacitors C1 and C2, a voltage update switch SWv, and a comparator COMP.

The capacitor C1 is connected between a first wire which transmits the direct-current voltage Vdc and a second wire which transmits the ground voltage Vss. The voltage update switch SWv has one end connected to the first wire and the other end connected to one end of the capacitor C2. The capacitor C2 has one end connected to the voltage update switch SWv and the other end connected to the second wire. The comparator COMP has one terminal (e.g., negative input terminal) to which a voltage VC1 smoothed by the capacitor C1 is input and the other terminal (e.g., positive input terminal) to which a voltage VC2 determined according to the charge accumulated in the capacitor C2 is input. The comparator COMP sets the detection signal DET to the high level when the voltage VC1 becomes larger than the voltage VC2. Further, the open/close state of the voltage update switch SWv is controlled by a voltage update signal Cswv output from the control circuit 24.

Figure 3:
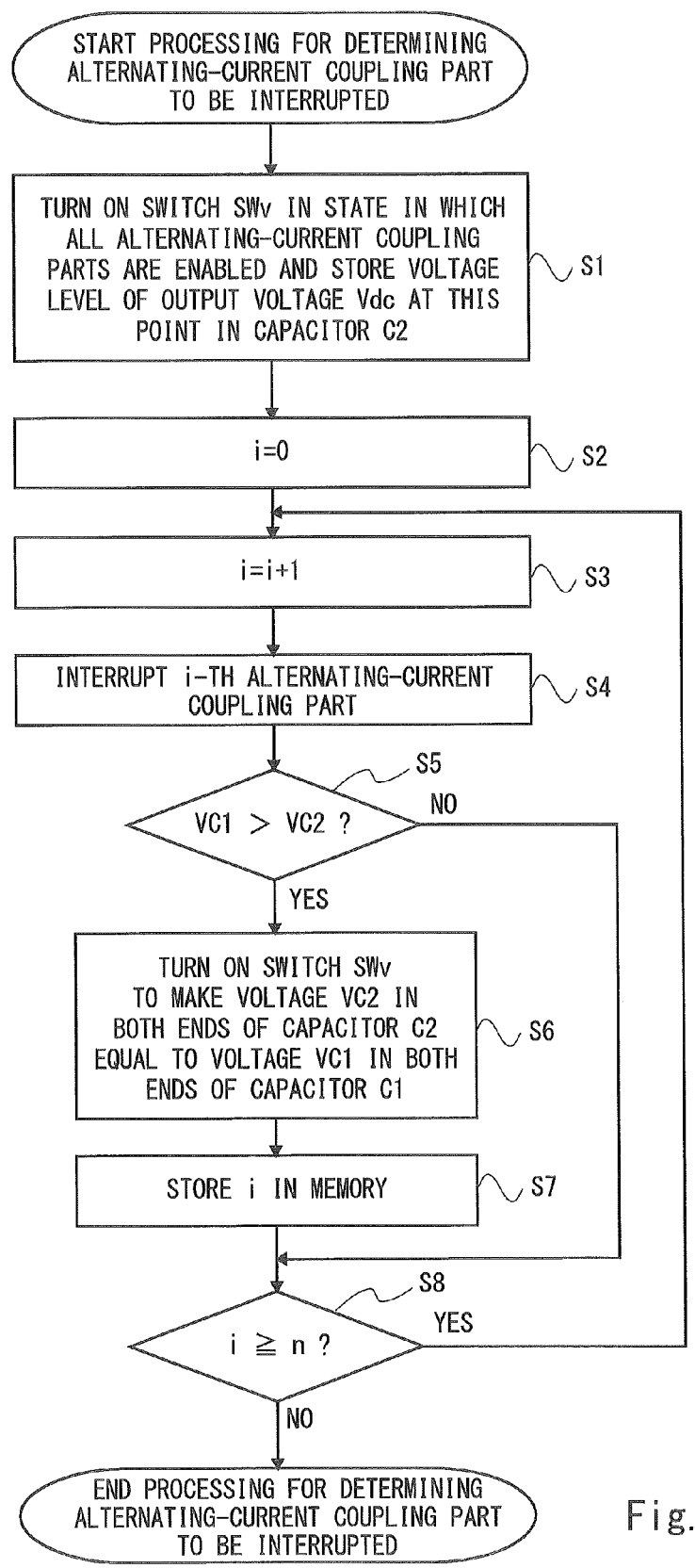
FIG. 3 is a flowchart showing processing for determining an alternating-current coupling element to be cut off in the semiconductor device according to the first embodiment.

Next, FIG. 3 is a flowchart showing processing for determining an alternating-current coupling element to be cut off (e.g., operation configuration processing) in the semiconductor device 1 according to the first embodiment. The operation configuration processing is preferably performed in an unloaded state in order to enhance the accuracy of measuring the value of the direct-current voltage.

As shown in FIG. 3, in the operation configuration processing, the control circuit 24 of the semiconductor device 1 first opens the input selection switches of the alternating-current coupling parts 11 to 11n, to enable all the alternating-current coupling parts 11 to 1n (e.g., transformer mode). The control circuit 24 further turns on the voltage update switch SWv of the voltage detection circuit 23. In this way, the voltage detection circuit 23 stores the voltage level of the direct-current voltage Vdc at this point in the capacitor C2 (Step S1).

Next, the control circuit 24 sets the value i indicating the number of the alternating-current coupling part to zero (Step S2), and then increments the value i by one (Step S3). Accordingly, the control circuit 24 short-circuits the input selection switch SW of the i-th alternating-current coupling part, and interrupts the alternating-current coupling part.

Next, the voltage detection circuit 23 compares the voltage VC2 generated in both ends of the capacitor C2 with the voltage VC1 in which the voltage level of the direct-current voltage Vdc is reflected (Step S5). When it is determined that the voltage VC1 is larger than the voltage VC2, the control circuit 24 turns on the voltage update switch SWv and makes the voltage VC2 in both ends of the capacitor C2 equal to the voltage VC1 in both ends of the capacitor C1 (Step S6). Further, the control circuit 24 stores the value i at this time in a storage unit such as a memory (Step S7). Meanwhile, when it is determined in Step S5 that the voltage VC1 is equal to or lower than the voltage VC2, the control circuit 24 proceeds to the next step without performing processing of Steps S6 and S7. In this case, the voltage value held by the capacitor C2 and the value i stored in the memory are updated.

In Step S8, the control circuit 24 determines whether the value i is equal to or larger than n (n is an integer indicating the number of alternating-current coupling parts). When the value i is smaller than n in Step S8, the control circuit 24 increments the value i by 1 in Step S3, and executes processing from Step S4 to Step S8 again. Meanwhile, when the value i is equal to or larger than n in Step S8, the control circuit 24 ends the operation configuration processing. The control circuit 24 outputs the input selection signals Cs1 to Csn to interrupt the alternating-current coupling part corresponding to the value i determined by the operation configuration processing in the following normal state. When the value i is absent or the value i has an initial value (e.g., 0), the control circuit 24 opens all the input selection switches SW, to output the input selection signals Cs1 to Csn which use all the alternating-current coupling parts in the transformer mode in the following normal state.

Figure 4:
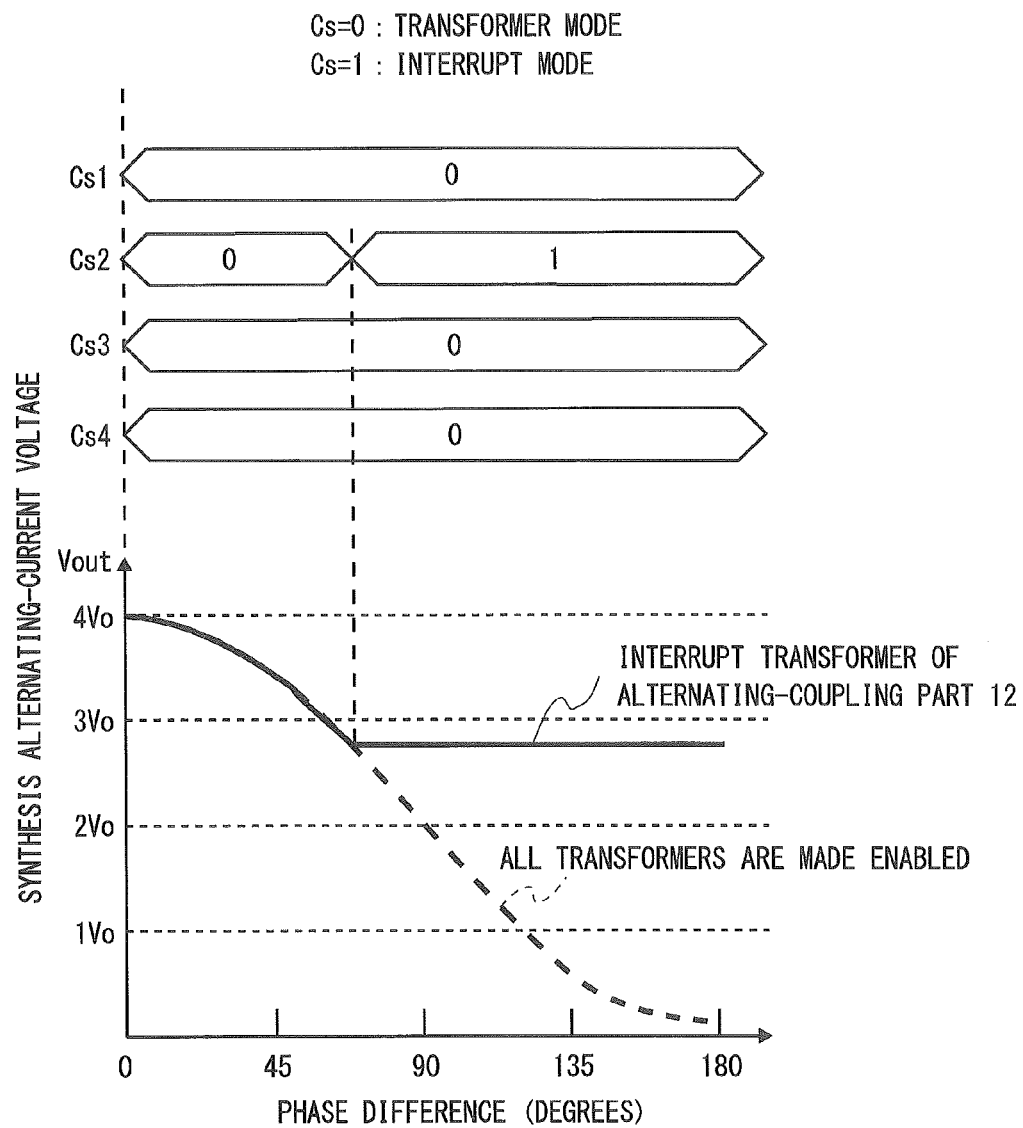
FIG. 4 is a timing chart showing an operation of the semiconductor device according to the first embodiment.

Next, an operation of the semiconductor device 1 according to the first embodiment will be described. FIG. 4 shows a timing chart showing the operation of the semiconductor device 1 according to the first embodiment. The timing chart shown in FIG. 4 sets n indicating the number of alternating-current coupling parts to 4, and indicates the voltage level of the output alternating-current signal when the phase of the input alternating-current signal output from the alternating-current signal source PS2 is shifted from the other phases. The horizontal axis of the graph in the lower part of FIG. 4 indicates a phase difference between the input alternating-current signal output from the alternating-current signal source PS2 and the other input alternating-current signals. The vertical axis indicates the signal level of the output alternating-current signal, and shows the signal level of the alternating-current signal output from one alternating-current coupling part in a unit voltage Vo. The unit voltage Vo is the alternating-current voltage output when the loss in the alternating-current coupling part is zero, and some loss actually occurs in the alternating-current coupling part.

As shown in FIG. 4, when all the transformers are enabled (transformer mode which opens the input selection switches), as the phase difference between the input alternating-current signal output from the alternating-current signal source PS2 and the other input alternating-current signals increases, the signal level of the output alternating-current signal lowers compared to a case in which one alternating-current coupling part is lost.

Meanwhile, as shown in FIG. 4, in the semiconductor device 1 according to the first embodiment, when the phase difference between the input alternating-current signal output from the alternating-current signal source PS2 and the other input alternating-current signals increases and the signal level of the output alternating-current signal becomes smaller than three times the unit voltage Vo, the input selection switch SW of the alternating-current coupling part 12 which receives the input alternating-current signal output from the alternating-current signal source PS2 is short-circuited. Accordingly, even when the phase difference between the input alternating-current signal output from the alternating-current signal source PS2 and the other input alternating-current signals becomes large, the semiconductor device 1 according to the first embodiment is able to keep the signal level of the output alternating-current signal so that it does not fall below the signal level which puts the input selection switch SW of the alternating-current coupling part 12 into the short-circuit state.

From the above description, it is seen that the semiconductor device 1 according to the first embodiment cuts off the input alternating-current signal which causes a reduction in the signal level by the alternating-current signal synthesis unit 10 in the state in which the signal level of the output alternating-current signal becomes lower than the signal level that is originally intended. Accordingly, the semiconductor device 1 according to the first embodiment is able to keep a predetermined signal level of the output alternating-current signal regardless of the phase difference between the input alternating-current signals. In short, the semiconductor device 1 according to the first embodiment is able to improve the energy recovery efficiency.

Further, the semiconductor device 1 according to the first embodiment is able to select the combination of the input alternating-current signals which maximizes the signal level of the output alternating-current signal by the voltage detection circuit 23 and the control circuit 24. Accordingly, the semiconductor device 1 according to the first embodiment is able to maximize the energy recovery efficiency.

Since the input alternating-current signals are directly input to the transformers T, the load capacity of the input terminals is small and the semiconductor device 1 according to the first embodiment is more suitable for energy recovery using high-frequency input alternating-current signals.

In the description according to the first embodiment, the control circuit 24 determines the combination of the input alternating-current signals to be synthesized so that the output alternating-current signal or the direct-current voltage is maximized. However, the control circuit 24 may determine the combination of the input alternating-current signals to be synthesized so that the output alternating-current signal or the direct-current voltage becomes equal to or larger than a predetermined voltage that is set in advance. This predetermined voltage may be the voltage in which the internal circuit connected to the subsequent stage of the AC/DC conversion circuit 22 can operate. Further, as another example, if a desired minimum output amplitude is determined for one transformer T, the direct-current voltage or the output alternating-current signal corresponding to (n−1) times the minimum output amplitude may be set as the predetermined voltage.

Second Embodiment

Figure 5:
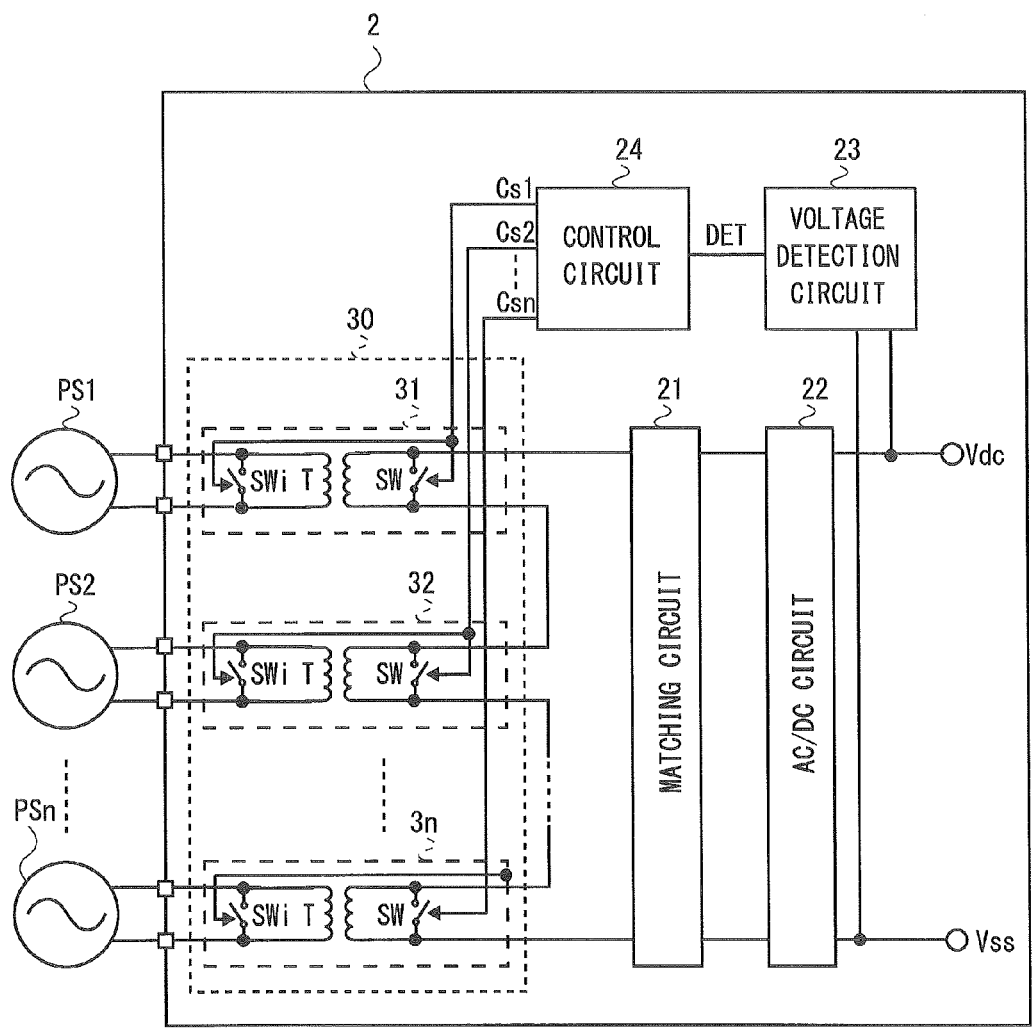
FIG. 5 is a block diagram of a semiconductor device according to a second embodiment.

In a second embodiment, a semiconductor device 2, which is another form of the semiconductor device 1 according to the first embodiment, will be described. FIG. 5 shows a block diagram of the semiconductor device 2 according to the second embodiment.

As shown in FIG. 5, the semiconductor device 2 according to the second embodiment includes an alternating-current signal synthesis unit 30 in place of the alternating-current signal synthesis unit 10 in the semiconductor device 1 according to the first embodiment. The alternating-current signal synthesis unit 30 includes alternating-current coupling parts 31 to 3n. The alternating-current coupling parts 31 to 3n each include input selection switches provided in each of the primary side and the secondary side of the transformer T in each of the alternating-current coupling parts 11 to 1n according to the first embodiment.

More specifically, the input selection switches of each of the alternating-current coupling parts 31 to 3n include a primary-side input selection switch SWi provided in the primary side of the corresponding transformer T and a secondary-side input selection switch SW provided in the secondary side of the corresponding transformer T. The primary-side input selection switch SWi switches whether to short-circuit or open the first input terminal and the second input terminal on the primary side of the transformer T according to the corresponding input selection signal. The secondary-side input selection switch SW switches whether to short-circuit or open the first output terminal and the second output terminal on the secondary side of the transformer T according to the corresponding input selection signal. In summary, the primary-side input selection switch SWi and the secondary-side input selection switch SW switch whether to make the corresponding transformer T into the interrupt mode or the transformer mode according to the same input selection signal.

In the semiconductor device 2 according to the second embodiment, the input selection switch is provided in each of the primary side and the secondary side of the transformer T in each of the alternating-current coupling parts 31 to 3n. However, the input selection switch may be provided only in the primary side of the transformer T.

In the semiconductor device 2 according to the second embodiment, the input selection switch, in addition to being provided in the secondary side of the transformer T, is also provided in the primary side of the transformer T. It is thus possible to put the primary side of the transformer T into the interrupt state, thereby making it possible to reduce the signal leakage from the primary side to the secondary side of the transformer T. In particular, when the power of the input alternating-current signals output from the alternating-current signal sources PS1 to PSn is large (e.g., when the signals have a low frequency and a large amplitude), the influence of the signal leakage from the primary side to the secondary side of the transformer T is large, and the presence of the input selection switch in the primary side of the transformer T in addition to its presence in the secondary side thereof is highly effective.

Third Embodiment

Figure 6:
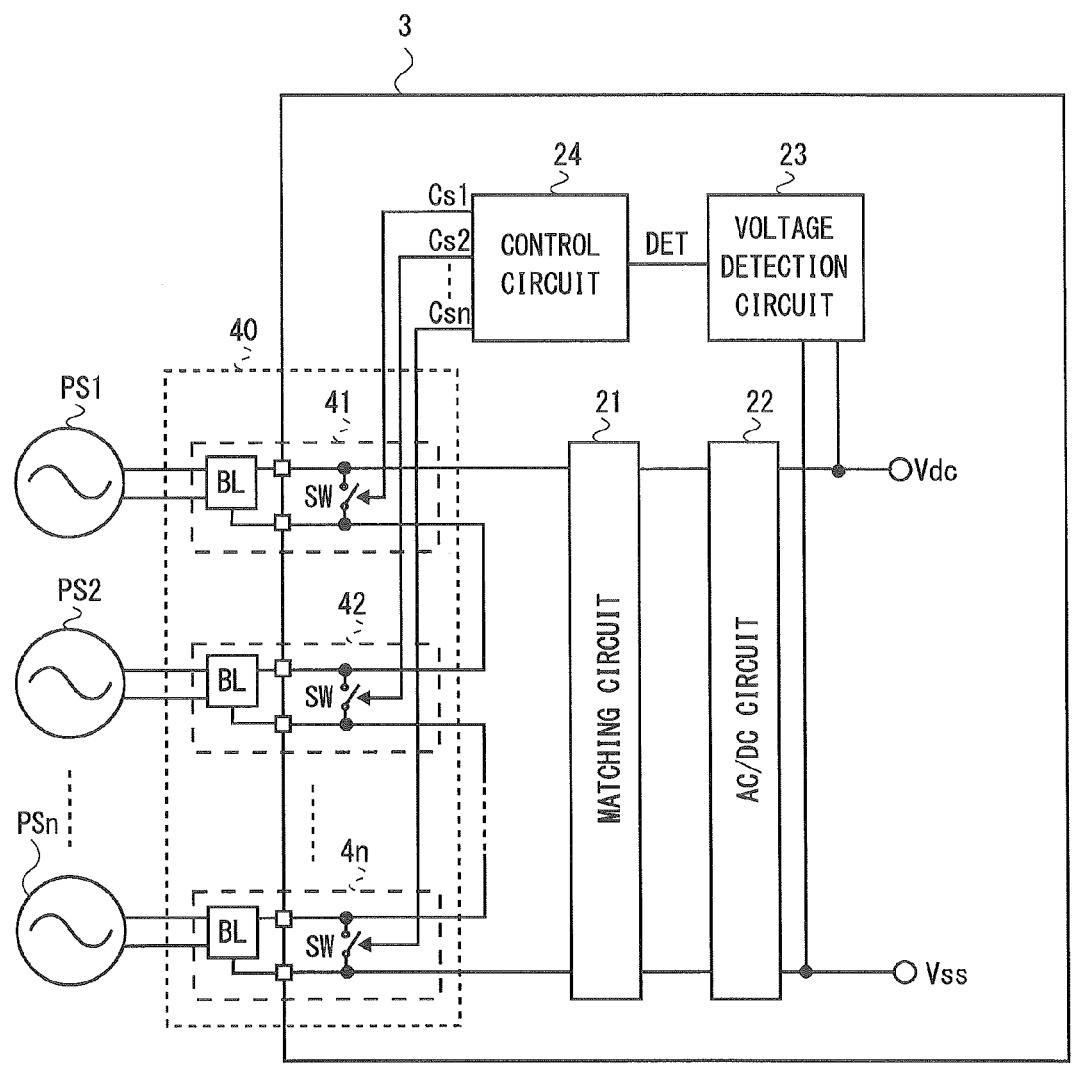
FIG. 6 is a block diagram of a semiconductor device according to a third embodiment.

In a third embodiment, a semiconductor device 3, which is another form of the semiconductor device 1 according to the first embodiment, will be described. FIG. 6 shows a block diagram of the semiconductor device 3 according to the third embodiment.

As shown in FIG. 6, the semiconductor device 3 according to the third embodiment includes an alternating-current signal synthesis unit 40 in place of the alternating-current signal synthesis unit 10 in the semiconductor device 1 according to the first embodiment. The alternating-current signal synthesis unit 40 includes alternating-current coupling parts 41 to 4n. The alternating-current coupling parts 41 to 4n include baluns BL in place of the transformers T in the alternating-current coupling parts 11 to 1n according to the first embodiment.

Like transformers, baluns are also able to transmit alternating-current signals. However, transformers differ from baluns in terms of their respective circuit areas and the corresponding frequencies of the signals to be transmitted. The baluns are able to transmit high-frequency signals of up to about 5 GHz. On the other hand, when provided as external elements, the transformers are able to transmit signals having the corresponding frequency of up to about 100 kHz. When the transformers are formed by a wiring pattern formed on a semiconductor substrate, the corresponding frequency may be arbitrarily set.

Further, regarding the circuit area, the transformers arranged as the external elements and the baluns do not require circuits on a chip, thereby making it possible to reduce the chip size. The transformers formed by the wiring pattern formed on the semiconductor substrate require a large chip size.

It is possible to appropriately set which element to use as the alternating-current coupling-element depending on the specifications of a product or the like.

From the above description, it is seen that the semiconductor device 3 according to the third embodiment uses the alternating-current signal synthesis unit 40 using the baluns as the alternating-current coupling elements, thereby making it possible to perform synthesis of the input alternating-current signals having high frequencies. While the baluns are provided as the external elements, the size of the elements and the area can be reduced. Typical baluns using capacitors or inductors, or wound-wire chip baluns may be used.

Fourth Embodiment

Figure 7:
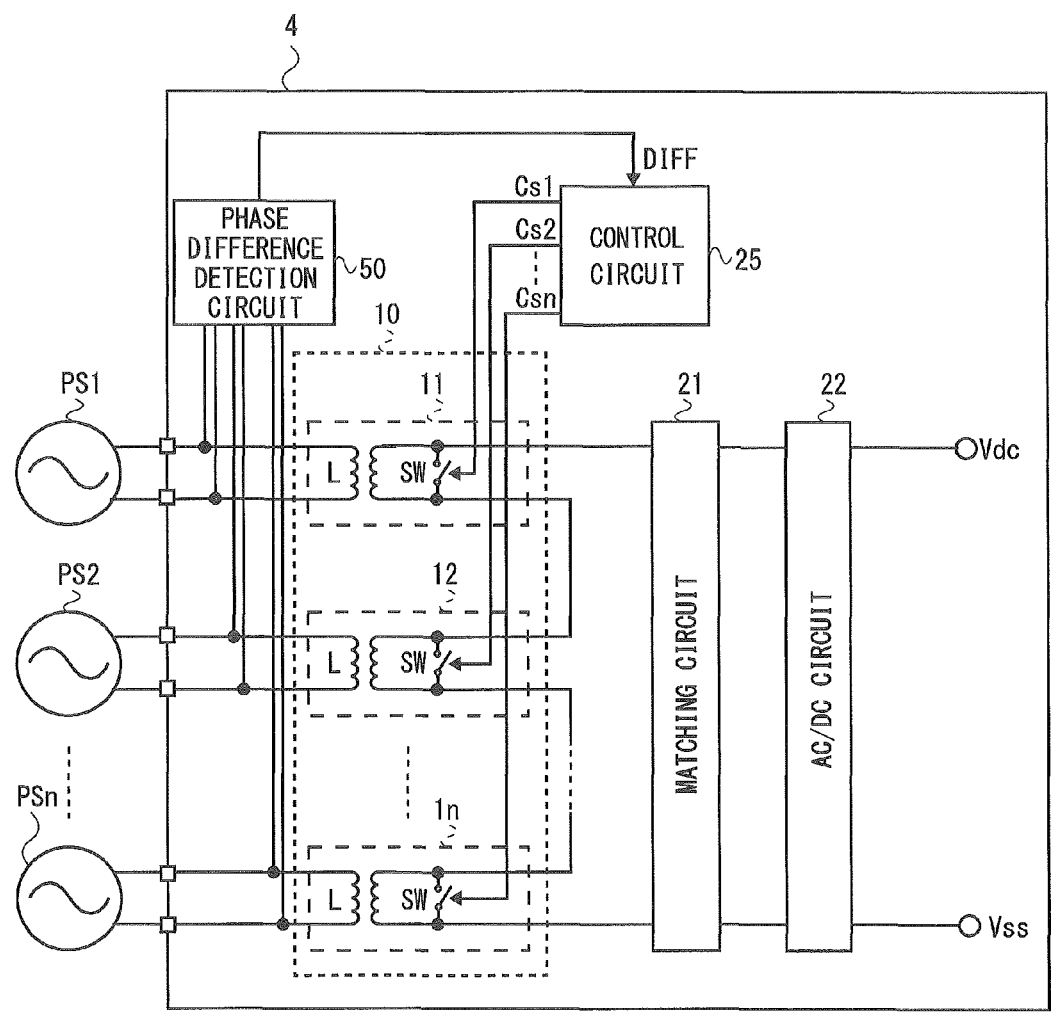
FIG. 7 is a block diagram of a semiconductor device according to a fourth embodiment.

In a fourth embodiment, a semiconductor device 4, which is another form of the semiconductor device 1 according to the first embodiment, will be described. FIG. 7 shows a block diagram of the semiconductor device 4 according to the fourth embodiment.

As shown in FIG. 7, the semiconductor device 4 according to the fourth embodiment includes a control circuit 25 and a phase difference detection circuit 50 in place of the control circuit 24 and the voltage detection circuit 23, respectively, in the semiconductor device 1 according to the first embodiment.

The phase difference detection circuit 50 detects a phase difference between the plurality of input alternating-current signals. The phase difference detection circuit 50 outputs phase difference information DIFF that is detected to the control circuit 25. The control circuit 25 outputs, based on the phase difference detected in the phase difference detection circuit, the input selection signals Cs1 to Csn which instruct to exclude, from the target to be synthesized, a second input alternating-current signal (hereinafter referred to as an out-of-group input alternating-current signal) of the plurality of input alternating-current signals in which the phase difference from the first input alternating-current signal (hereinafter referred to as an in-group input alternating-current signal) becomes equal to or larger than a predetermined phase difference.

Figure 8A:
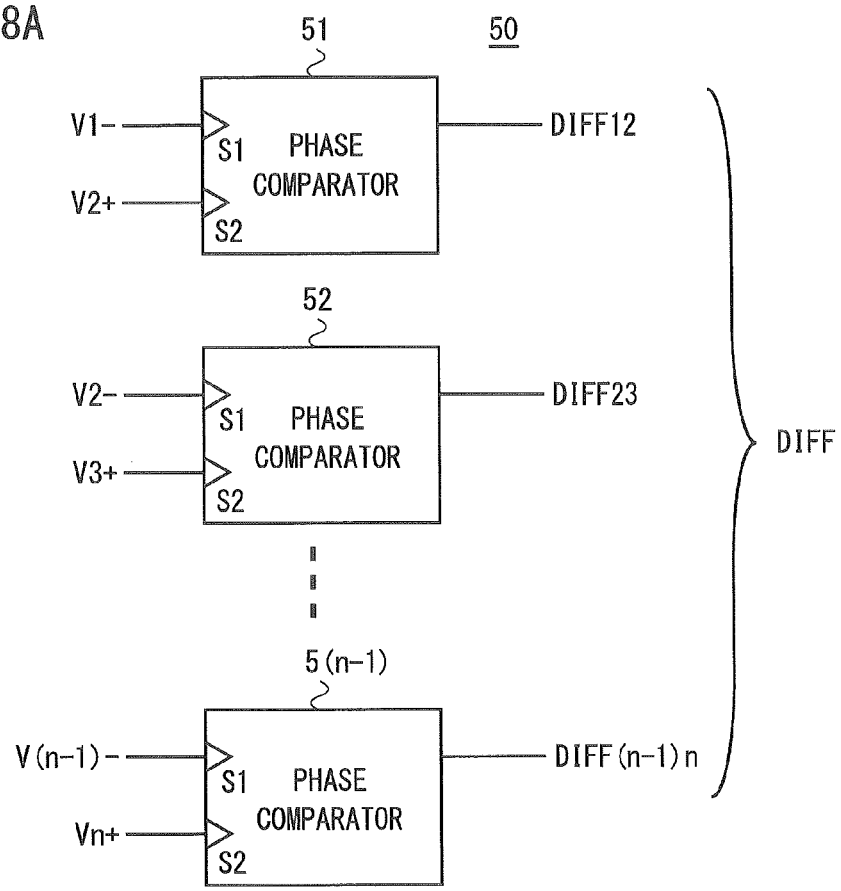
FIG. 8A is a block diagram of the phase difference detection circuit.

The details of the phase difference detection circuit 50 will be described more particularly. FIG. 8A, B show a block diagram of the phase difference detection circuit 50 and phase comparators in the phase difference detection circuit 50 according to the fourth embodiment. FIG. 8A shows a block diagram of the phase difference detection circuit 50 and FIG. 8B shows a block diagram of the phase comparators in the phase difference detection circuit 50.

As shown in FIG. 8A, the phase difference detection circuit 50 includes (n−1) phase comparators for n input alternating-current signals. In FIG. 8A, phase comparators 51 to 5($n$−1) are shown as the phase difference detection circuit 50. The phase comparators 51 to 5($n$−1) each include a terminal S1 that receives an inverted signal of the input alternating-current signal located in the higher level among the plurality of input alternating-current signals, and a terminal S2 that receives a normal rotation signal of the input alternating-current signal located in the lower level. The phase comparators 51 to 5($n$−1) separately output phase difference determination signals DIFF 12 to DIFF(n−1)n having a pulse width according to the magnitude of the phase difference between the signal input to the terminal S1 and the signal input to the terminal S2. The phase difference information DIFF is a signal including the phase difference determination signals DIFF 12 to DIFF(n−1)n.

Figure 8B:
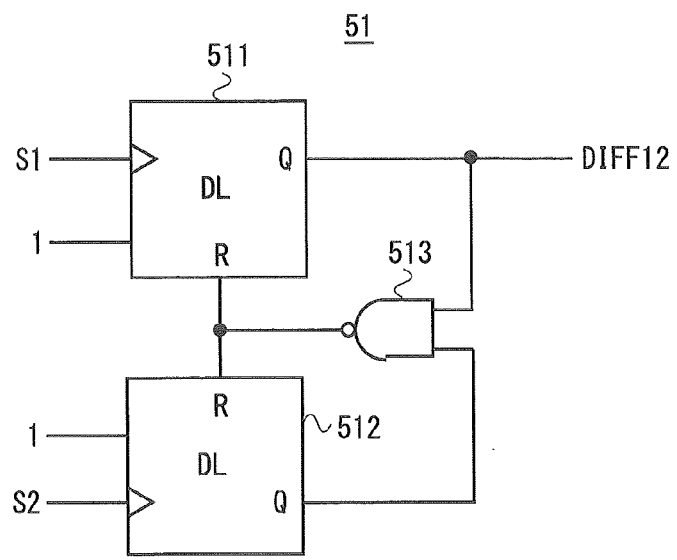
FIG. 8B is a block diagram of the phase comparators in the phase difference detection circuit.

Further, since the phase comparators 51 to 5($n$−1) have the same circuit configuration, only the block diagram of the phase comparator 51 is shown in FIG. 8B. As shown in FIG. 8B, the phase comparator 51 includes D-latches 511 and 512, and a NAND circuit 513. The D-latch 511 receives a signal input to a terminal S1 as a trigger signal and data having a value of 1 (e.g., high-level, and a value having a voltage of power supply voltage level). The D-latch 511 further receives an output signal as a reset signal. The D-latch 512 receives a signal input to a terminal S2 as a trigger signal, and data having a value of 1. The D-latch 512 further receives an output signal as a reset-signal. The NAND circuit 513 outputs the inverted logical AND of the output signals of the D-latches 511 and 512 to the reset terminals of the D-latches 511 and 512.

In the phase comparator 51, when there is no phase difference between the signal input to the terminal S1 and the signal input to the terminal S2, the output signals of the D-latches 511 and 512 become 1 at the same time, and the D-latches 511 and 512 are immediately reset. Accordingly, when there is no phase difference between the signal input to the terminal S1 and the signal input to the terminal S2, the phase comparator 51 outputs a pulse signal having a short pulse width as the phase difference determination signal DIFF 12 which is the output signal.

Meanwhile, in the phase comparator 51, when the phase of the signal input to the terminal S1 advances with respect to the phase of the signal input to the terminal S2, the output signal of the D-latch 511 becomes 1, and after the elapse of time corresponding to the phase difference, the output signal of the D-latch 512 becomes 1. Accordingly, the output signal of the NAND circuit 513 becomes the high level for a time period corresponding to the phase difference. Accordingly, the phase comparator 51 outputs, when there is a phase difference between the signal input to the terminal S1 and the signal input to the terminal S2, a phase difference determination signal-having a pulse width according to the time corresponding to the phase difference.

Since the phase information DIFF output from the phase difference detection circuit 50 is formed of the above phase difference determination signals, the control circuit 25 is able to specify, based on the phase difference determination signal having a pulse width larger than a predetermined pulse width threshold, the out-of-group input alternating-current signal in which the phase difference from the in-group input alternating-current signal becomes equal to or larger than the predetermined phase difference. The phase difference detection circuit 50 outputs the input selection signals Cs1 to Csn which interrupt the alternating-current signal synthesis unit corresponding to the out-of-group input alternating-current signal that is specified. Accordingly, the semiconductor device 4 is able to exclude the out-of-group input alternating-current signal from the input alternating-current signal to be synthesized, and to maximize the output alternating-current signal only by the in-group input alternating-current signal.

From the above description, it is seen that the semiconductor device 4 according to the fourth embodiment observes the phase difference between the input alternating-current signals to disable the input alternating-current signal having a large phase difference which reduces the efficiency of converting the input alternating-current signal into the output alternating-current signal. Accordingly, the semiconductor device 4 according to the fourth embodiment is able to maximize the magnitude of the output alternating-current signal regardless of the phase difference of the input alternating-current signals.

Fifth Embodiment

Figure 9:
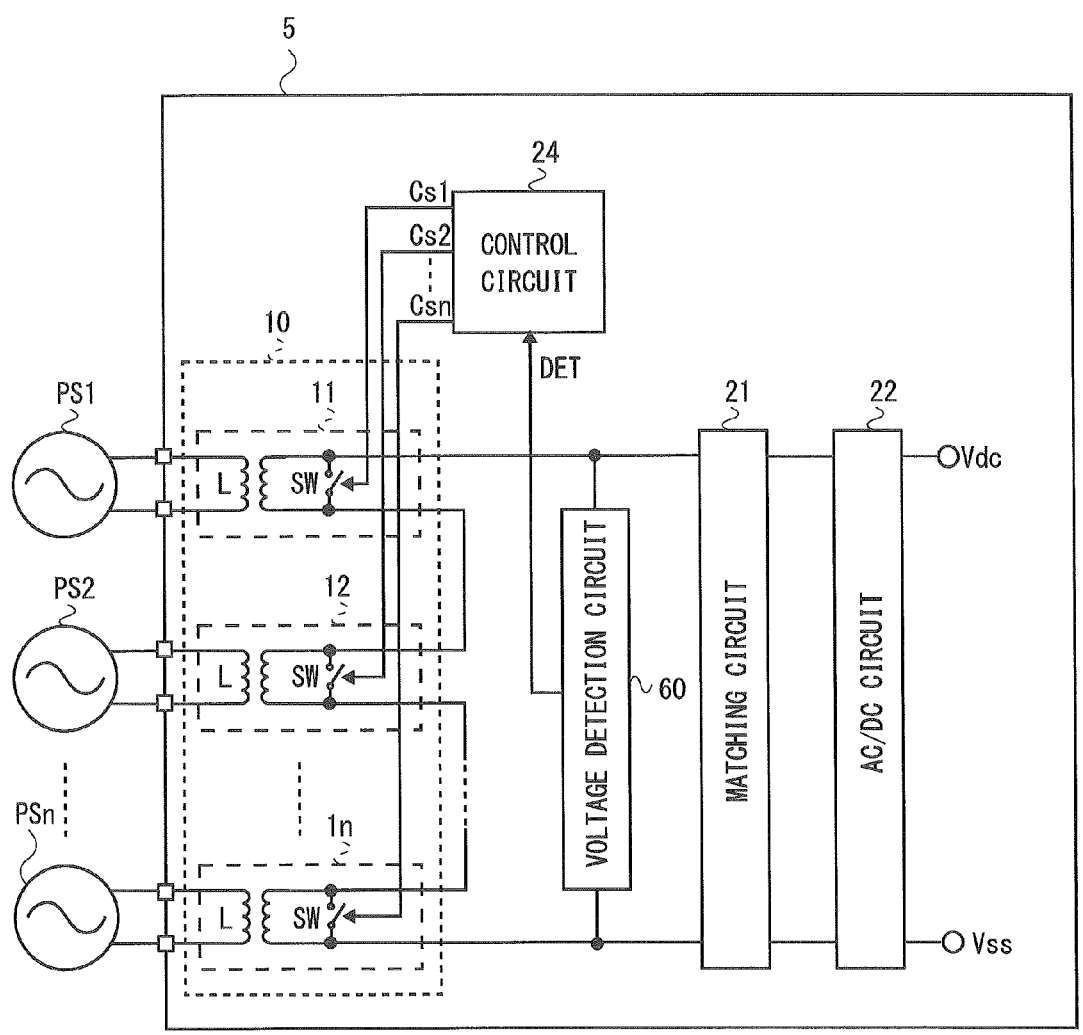
FIG. 9 is a block diagram of a semiconductor device according to a fifth embodiment.

In a fifth embodiment, a semiconductor device 5, which is another form of the semiconductor device 1 according to the first embodiment, will be described. FIG. 9 shows a block diagram of the semiconductor device 5 according to the fifth embodiment.

As shown in FIG. 9, the semiconductor device 5 according to the fifth embodiment includes a voltage detection circuit 60 in place of the voltage detection circuit 23 in the semiconductor device 1 according to the first embodiment. The voltage detection circuit 60 detects the voltage of the output alternating-current signal. More specifically, in the semiconductor device 5 according to the fifth embodiment, the voltage detection circuit 23 that detects the voltage value of the direct-current voltage is replaced with the voltage detection circuit 60 that detects the voltage of the output alternating-current voltage, and processing of the control circuit 24 may be the operation configuration processing which is the same as the processing in the first embodiment.

Figure 10:
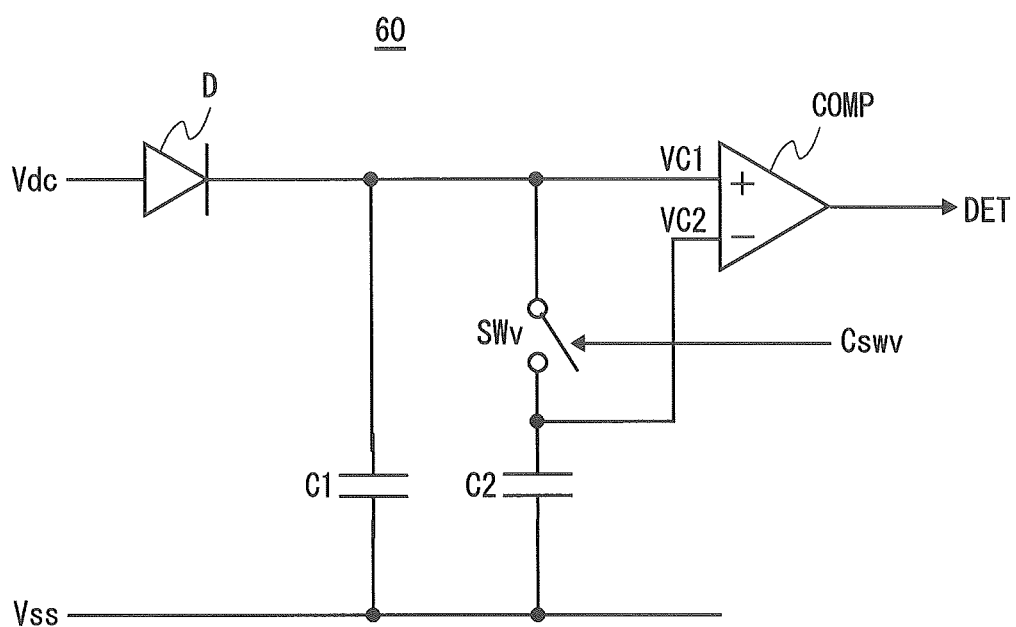
FIG. 10 is a block diagram of a voltage detection circuit according to the fifth embodiment.

A specific circuit configuration of the voltage detection circuit 60 will be described. FIG. 10 shows a block diagram of the voltage detection circuit 60 according to the fifth embodiment. As shown in FIG. 10, the voltage detection circuit 60 includes a diode D added to the wire which transmits the direct-current voltage Vdc of the voltage detection circuit 23 according to the first embodiment. By adding the diode D to the wire which transmits the direct-current voltage Vdc, the voltage detection circuit 60 is able to accumulate the voltage obtained by rectifying the output alternating-current signal in the capacitors C1 and C2. The voltage detection circuit 60 outputs a result of comparing voltages VC1 and VC2 obtained by rectifying the output alternating-current signal as a voltage detection signal DET.

From the above description, it is seen that the semiconductor device 5 according to the fifth embodiment determines the combination of the input alternating-current signals to be synthesized by directly measuring the voltage of the output alternating-current signal. Accordingly, the semiconductor device 5 according to the fifth embodiment is able to determine the combination of the input alternating-current signals to be synthesized with higher accuracy compared to the semiconductor device 1 according to the first embodiment.

Sixth Embodiment

Figure 11:
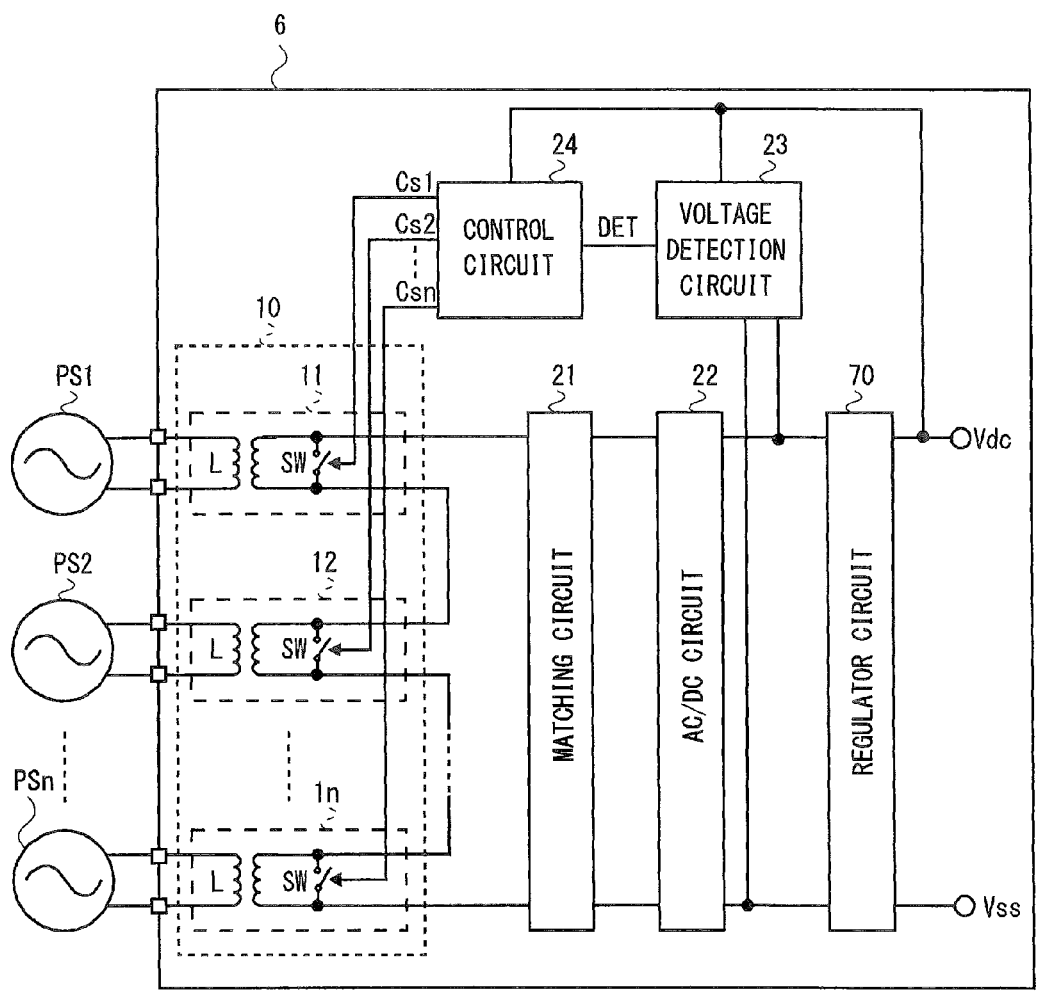
FIG. 11 is a block diagram of a semiconductor device according to a sixth embodiment.

In a sixth embodiment, a semiconductor device 6, which is another form of the semiconductor device 1 according to the first embodiment, will be described. FIG. 11 shows a block diagram of the semiconductor device 6 according to the sixth embodiment.

As shown in FIG. 11, the semiconductor device 6 according to the sixth embodiment includes a regulator circuit 70 added to the semiconductor device 1 according to the first embodiment. The regulator circuit 70 steps down or steps up a direct-current voltage signal to generate an internal power supply. The internal power supply voltage is determined by the voltage of the internal power to be supplied to an internal circuit (not shown). Whether to use a step-up circuit or a step-down circuit as the regulator circuit 70 is determined according to the magnitude relation of the voltage of the internal power supply and a direct-current voltage output from the AC/DC conversion circuit 22.

Further, as shown in FIG. 11, the semiconductor device 6 according to the sixth embodiment uses an internal power supply output from the regulator circuit 70 as an operation power supply of the control circuit 24 and the voltage detection circuit 23. In the semiconductor device 1 according to the first embodiment, the voltage detection circuit 23 and the control circuit 24 are operated based on the power supplied from a battery (not shown) or an external power supply.

From the above description, it is seen that the semiconductor device 6 according to the sixth embodiment uses the regulator circuit 70, whereby it is possible to operate the internal circuit including the voltage detection circuit 23 and the control circuit 24 by the energy recovered using the alternating-current signal synthesis unit 10.

Further, the semiconductor device 6 according to the sixth embodiment uses the regulator circuit 70, whereby it is possible to supply an internal power with stable voltage to the internal circuit even when the direct-current voltage output from the AC/DC conversion circuit 22 varies.

Seventh Embodiment

Figure 12:
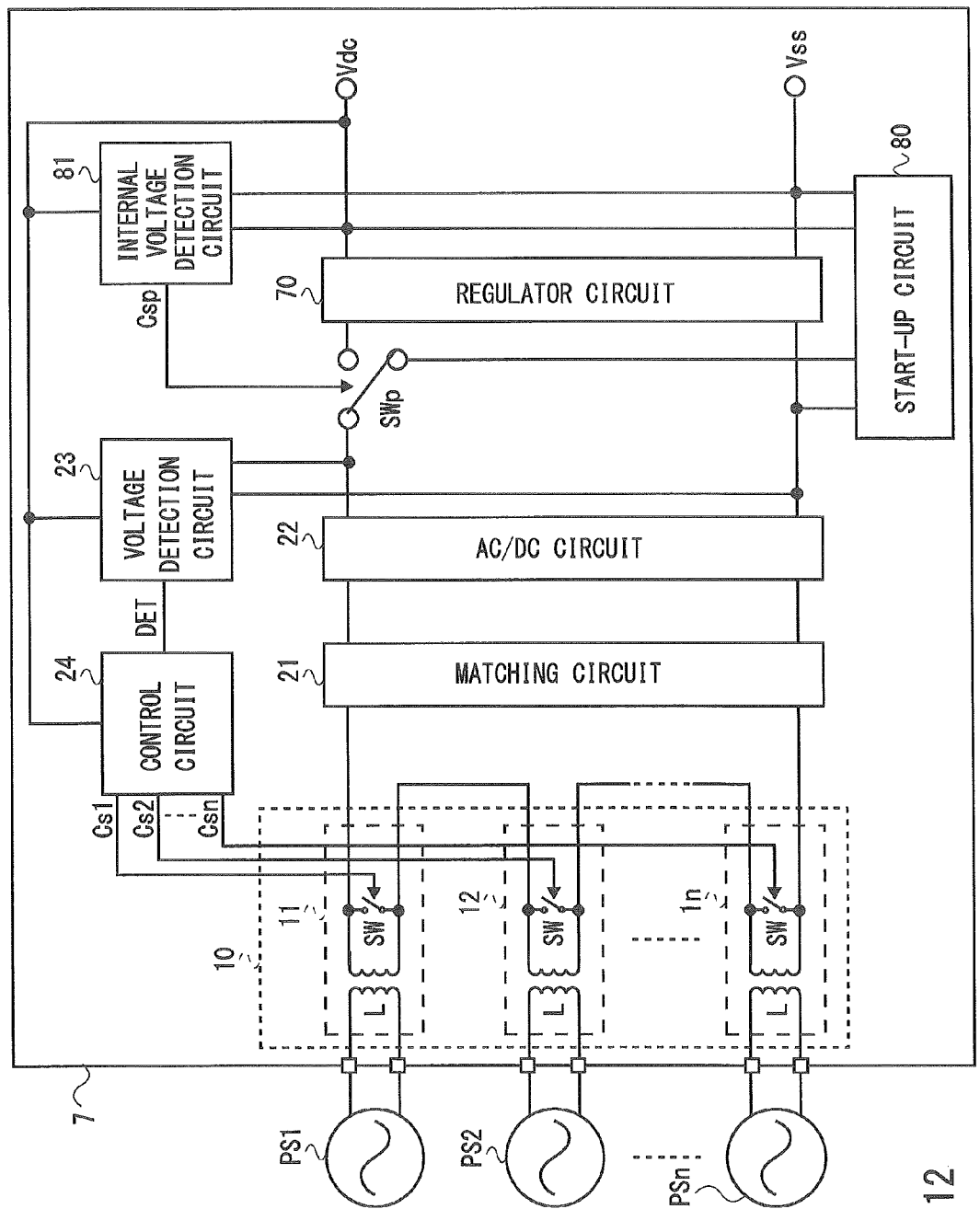
FIG. 12 is a block diagram of a semiconductor device according to a seventh embodiment.

In a seventh embodiment, a semiconductor device 7, which is another form of the semiconductor device 6 according to the sixth embodiment, will be described. FIG. 12 shows a block diagram of the semiconductor device 7 according to the seventh embodiment.

As shown in FIG. 12, the semiconductor device 7 according to the seventh embodiment includes a start-up circuit 80, an internal voltage detection circuit 81, and a power supply changeover switch SWp added to the semiconductor device 6 according to the sixth embodiment.

The start-up circuit 80 is provided in parallel with the regulator circuit 70, and it generates an internal power supply based on an input voltage which is lower than a voltage input to the regulator circuit, and outputs the internal power supply to an output terminal of the regulator circuit 70. The power supply changeover switch SWp transmits a direct-current voltage signal output from the AC/DC conversion circuit 22 to one of the regulator circuit 70 and the start-up circuit 80. The internal voltage detection circuit 81 monitors a voltage of an output terminal of the regulator circuit 70, and outputs a power supply selection signal to the power supply changeover switch SWp when the voltage of the output terminal of the regulator circuit has reached a predetermined voltage or more, the power supply selection signal instructing transmission of the direct-current voltage signal to the regulator circuit 70. The internal voltage detection circuit 81 further outputs to the power supply changeover switch SWp the power supply selection signal to instruct transmission of the direct-current voltage signal to the start-up circuit 80 in the period in which the voltage of the output terminal of the regulator circuit is lower than a predetermined voltage.

The semiconductor device 7 according to the seventh embodiment employs the above configuration. Accordingly, in the period in which the direct-current voltage output from the AC/DC conversion circuit 22 is the voltage level at which the regulator circuit 70 does not operate and the regulator circuit 70 cannot generate a sufficient internal power supply, the internal power supply is generated by the start-up circuit 80.

From the above description, it is seen that the semiconductor device 7 according to the seventh embodiment is able to generate the internal power supply by the start-up circuit 80 even when the direct-current voltage is not sufficient to operate the regulator circuit 70 since, for example, the output alternating-current voltage output from the alternating-current signal synthesis unit 10 is not at a sufficient signal level. In short, the semiconductor device 7 according to the seventh embodiment is able to achieve a more stable operation than that in the semiconductor devices according to the other embodiments.

Eighth Embodiment

Figure 13:
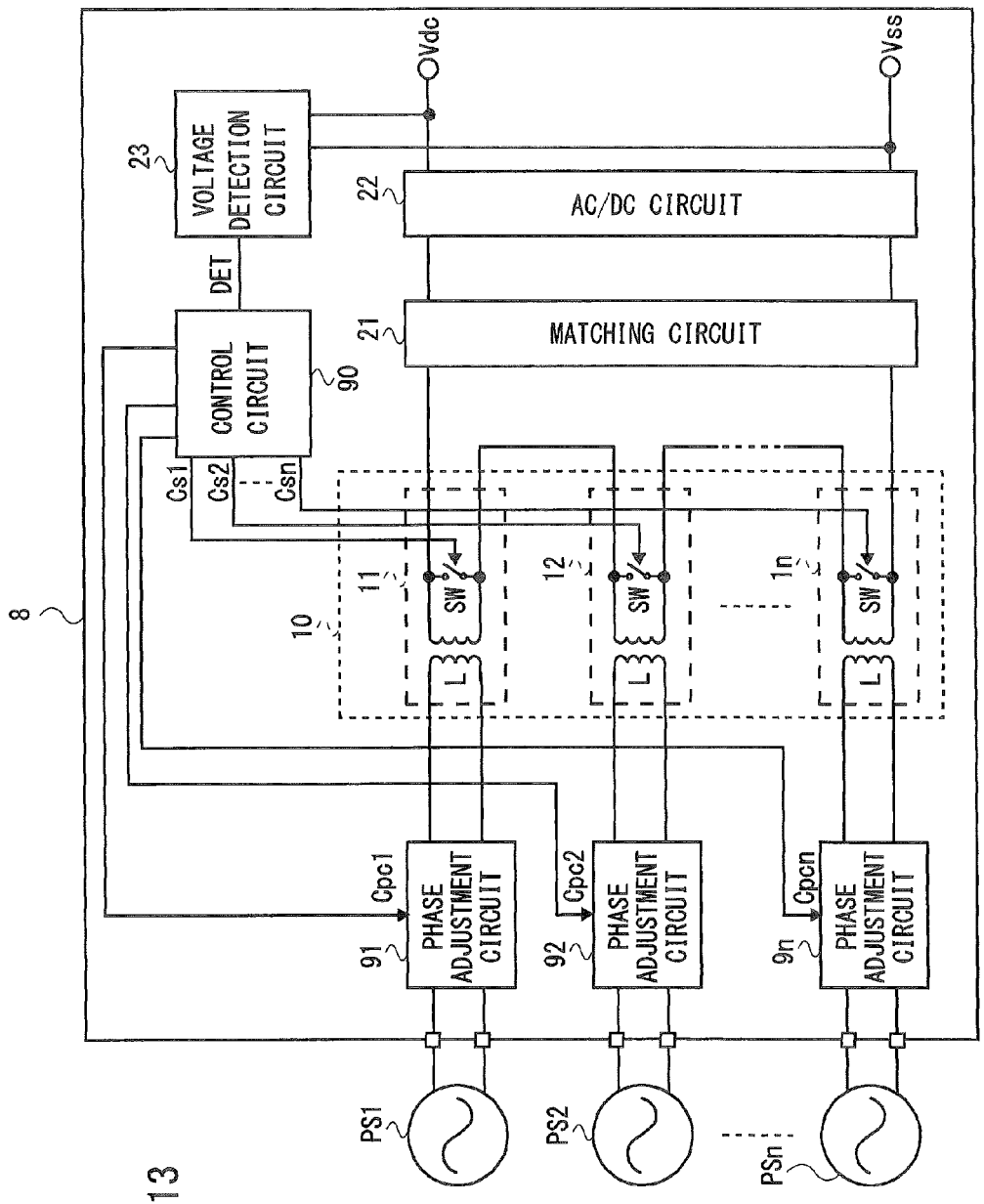
FIG. 13 is a block diagram of a semiconductor device according to an eighth embodiment.

In an eighth embodiment, a semiconductor device 8 according to the eighth embodiment, which is another form of the semiconductor device 1 according to the first embodiment, will be described. FIG. 13 shows a block diagram of the semiconductor device 8 according to the eighth embodiment.

As shown in FIG. 13, the semiconductor device 8 according to the eighth embodiment includes a control circuit 90 in place of the control circuit 24 in the semiconductor device 1 according to the first embodiment, and further includes phase adjustment circuits 91 to 9n.

The control circuit 90 further includes, in addition to the configuration of the control circuit 24, a function of outputting phase control signals Cpc1 to Cpcn that control the phase adjustment circuits 91 to 9n. The phase adjustment circuits 91 to 9n are provided between the alternating-current signal synthesis unit 10 and the alternating-current power supplies PS1 to PSn that output a plurality of input alternating-current signals, and adjust the phase of the input alternating-current signal in which it is determined that the phase difference from other input alternating-current signals is equal to or larger than a predetermined phase difference.

Figure 14:
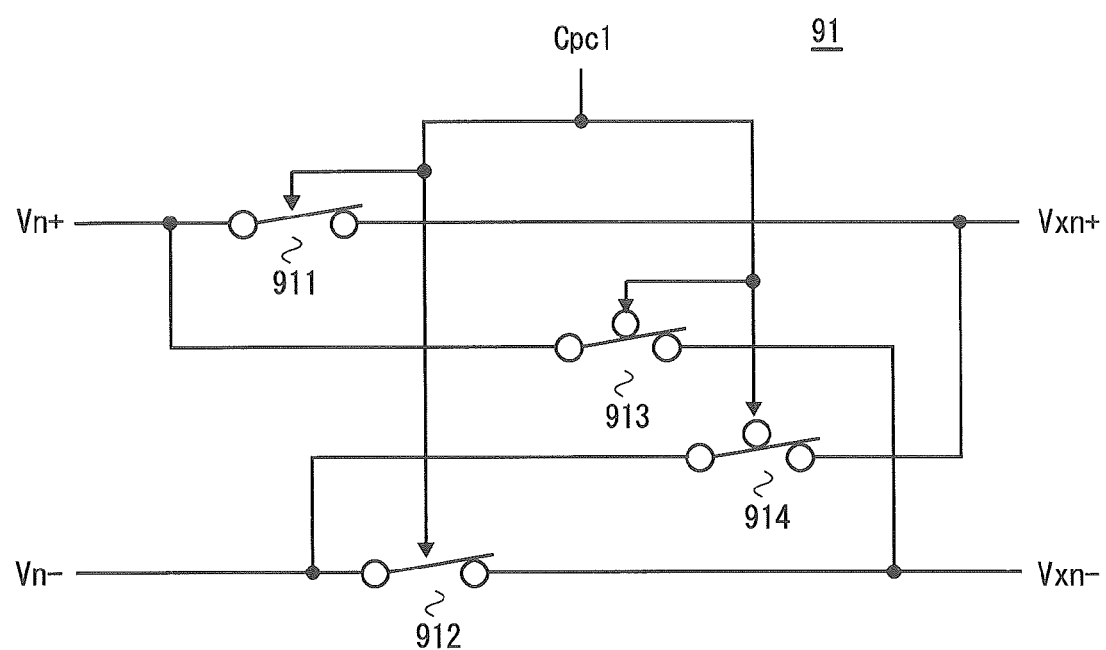
FIG. 14 is a circuit diagram of a phase adjustment circuit according to the eighth embodiment.

Now, the details of the phase adjustment circuits 91 to 9n will be specifically described. FIG. 14 shows a circuit diagram of the phase adjustment circuit according to the eighth embodiment. Since the phase adjustment circuits 91 to 9n have the same circuit configuration, only the phase adjustment circuit 91 will be described here. Further, in FIG. 14, a terminal which receives a normal rotation signal of the input alternating-current signal is shown by Vn+, a terminal which receives the inverted signal of the input alternating-current signal is shown by Vn−, a terminal which outputs the normal rotation signal of the input alternating-current signal is shown by Vxn+, and a terminal which outputs the inverted signal of the input alternating-current signal is shown by Vxn−.

As shown in FIG. 14, the phase adjustment circuit 91 includes switches 911 to 914. The switch 911 is arranged in the line which connects the input terminal Vn+ and the output terminal Vxn+. The switch 912 is arranged in the line which connects the input terminal Vn− and the output terminal Vxn−. The switch 913 is arranged in the line which connects the input terminal Vn+ and the output terminal Vxn−. The switch 914 is arranged in the line which connects the input terminal Vn− and the output terminal Vxn+. The switches 911 and 912 and the switches 913 and 914 are conducted exclusively from each other according to the phase control signal Cpc1. In summary, the phase adjustment circuit 91 transmits the input alternating-current signal to the alternating-current signal synthesis unit 10 without changing the polarity of the input alternating-current signal when the phase control signal Cpc1 is 1 (e.g., high-level), and transmits the input alternating-current signal to the alternating-current signal synthesis unit 10 after inverting the polarity of the input alternating-current signal (changing the phase by 180 degrees) when the phase control signal Cpc1 is 0 (e.g., low-level).

Now, an operation of the semiconductor device 8 according to the eighth embodiment will be described. The semiconductor device 8 according to the eighth embodiment first sets all the phase control signals Cpc1 to 1 to execute the operation configuration processing described with reference to FIG. 3. When it is determined in this operation configuration processing that there is an out-of-group input alternating-current signal which should be excluded from the target to be synthesized, the semiconductor device 8 inverts the logic of the phase control signal given to the phase adjustment circuit corresponding to the out-of-group input alternating-current signal. Accordingly, in the semiconductor device 8, the polarity of the signal determined as the out-of-group input alternating-current signal in the first operation configuration processing is inverted. The semiconductor device 8 then executes the operation configuration processing shown in FIG. 3 again in the state in which the polarity of the out-of-group input alternating-current signal is inverted. When it is determined in the second operation configuration processing that there is no out-of-group input alternating-current signal, the semiconductor device 8 synthesizes the n input alternating-current signals to generate the output alternating-current signal. Meanwhile, when it is determined in the second operation configuration processing that there is an out-of-group input alternating-current signal, the semiconductor device 8 synthesizes the (n−1) input alternating-current signals except for the out-of-group input alternating-current signal to generate an output alternating-current signal.

From the above description, it is seen that the semiconductor device 8 according to the eighth embodiment includes the phase adjustment circuits 91 to 9n. Therefore, even when there is an out-of-group input alternating-current signal, it is possible to change the phase of the out-of-group input alternating-current signal and synthesize n input alternating-current signals to generate an output alternating-current signal having a higher voltage. In summary, the semiconductor device 8 according to the eighth embodiment is able to generate an output alternating-current signal with higher efficiency than the semiconductor devices according to the other exemplary embodiments.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A power supply circuit comprising:
    an alternating-current signal synthesis unit that synthesizes a plurality of input alternating-current signals to output the synthesized signal as an output alternating-current signal;
    an AC/DC conversion circuit that converts the output alternating-current signal into a direct-current voltage signal; and
    a control circuit that generates an input selection signal, the input selection signal specifying a combination of the input alternating-current signals to be synthesized so that the output alternating-current signal or the direct-current voltage signal is maximized, wherein the alternating-current signal synthesis unit synthesizes the input alternating-current signals to be synthesized specified by the input selection signal to output the output alternating-current signal, and wherein the alternating-current signal synthesis unit comprises:
  a plurality of alternating-current coupling elements each having primary-side input terminals to which the respective input alternating-current signals are input and secondary-side terminals connected in series with each other; and
  a plurality of input selection switches that short-circuit or open at least one of the two primary-side terminals and the two secondary-side terminals of the respective alternating-current coupling elements according to the input selection signal.

2. The power supply circuit according to claim 1, wherein the plurality of input alternating-current signals are reception signals generated through an antenna which receives a radio signal.

3. The power supply circuit according to claim 1, further comprising a voltage detection circuit that detects a voltage of the direct-current voltage signal, wherein:
  the control circuit switches, by the input selection signal, the combination of the input alternating-current signals to be synthesized by the alternating-current signal synthesis unit,
  the voltage detection circuit detects the voltage of the direct-current voltage signal for each combination of the input alternating-current signals, and outputs a voltage detection signal to the control circuit every time a maximum value of the voltage of the direct-current voltage signal is updated, and
  the control circuit determines the combination of the input alternating-current signals which maximizes the voltage of the direct-current voltage signal according to the voltage detection signal, and outputs the input selection signal corresponding to the combination of the input alternating-current signals which maximizes the voltage of the direct-current voltage signal in a normal operation state.

4. The power supply circuit according to claim 1, comprising a regulator circuit which steps down or steps up the direct-current voltage signal to generate an internal power supply.

5. The power supply circuit according to claim 4, comprising:
  a start-up circuit that is arranged in parallel with the regulator circuit, generates the internal power supply based on an input voltage lower than a voltage input to the regulator circuit, and outputs the internal power supply to an output terminal of the regulator circuit;
  a power supply changeover switch that transmits the direct-current voltage signal to one of the regulator circuit and the start-up circuit; and
  an internal voltage detection circuit that monitors a voltage of the output terminal of the regulator circuit, and outputs a power supply selection signal to the power supply changeover switch when the voltage of the output terminal of the regulator circuit has reached a predetermined voltage or more, the power supply selection signal instructing transmission of the direct-current voltage signal to the regulator circuit.

6. The power supply circuit according to claim 1, comprising a voltage detection circuit that detects a voltage of the output alternating-current signal, wherein:
  the control circuit switches, by the input selection signal, the combination of the input alternating-current signals to be synthesized by the alternating-current signal synthesis unit,
  the voltage detection circuit detects the voltage of the direct-current voltage signal for each combination of the input alternating-current signals, and outputs a voltage detection signal to the control circuit every time a maximum value of the voltage of the direct-current voltage signal is updated, and
  the control circuit determines the combination of the input alternating-current signals which maximizes the voltage of the direct-current voltage signal according to the voltage detection signal, and outputs the input selection signal corresponding to the combination of the input alternating-current signals which maximizes the voltage of the direct-current voltage signal in a normal operation state.

7. The power supply circuit according to claim 1, comprising a phase difference detection circuit that detects a phase difference between the plurality of input alternating-current signals,
  wherein the control circuit outputs, based on the phase difference detected in the phase difference detection circuit, the input selection signal which instructs to exclude, from a target to be synthesized, a second input alternating-current signal of the plurality of input alternating-current signals in which a phase difference from a first input alternating-current signal is equal to or larger than a predetermined phase difference.

8. The power supply circuit according to claim 1, comprising a phase adjustment circuit that is provided between the alternating-current signal synthesis unit and a plurality of alternating-current power supplies that output the plurality of input alternating-current signals and adjusts a phase of an input alternating-current signal in which a phase difference from other input alternating-current signals is determined to be equal to or larger than a predetermined phase difference.

9. The power supply circuit according to claim 1, wherein the alternating-current signal synthesis unit comprises a transformer or a balun as an alternating-current coupling element.

10. A power supply circuit comprising:
  a plurality of alternating-current coupling elements each including a first input terminal and a second input terminal on a primary side to which an input alternating-current signal is input and a first output terminal and a second output terminal on a secondary side, the first output terminal and the second output terminal on the secondary side being connected in series, the plurality of alternating-current coupling elements outputting an output alternating-current signal from between the first output terminal provided in a lowest level and the second output terminal provided in a highest level;
  a plurality of input selection switches that are provided in the respective alternating-current coupling elements and provided between the terminals on the primary side or the terminals on the secondary side;
  an AC/DC conversion circuit that converts the output alternating-current signal into a direct-current voltage signal; and
  a control circuit that generates an input selection signal specifying a combination of the input alternating-current signals to be synthesized so as to maximize the output alternating-current signal or the direct-current voltage signal, wherein the plurality of input selection switches switch, according to the input selection signal, whether to short-circuit or open the terminals on the primary side and the terminals on the secondary side.

11. The power supply circuit according to claim 10, wherein the plurality of input alternating-current signals are reception signals generated through an antenna which receives a radio signal.

12. The power supply circuit according to claim 10, wherein the plurality of alternating-current coupling elements are formed on the same semiconductor substrate on which the plurality of input selection switches, the AC/DC conversion circuit, and the control circuit are formed.

13. The power supply circuit according to claim 10, wherein the input selection switches each comprise at least one of a primary-side input selection switch provided between the terminals on the primary side and a secondary-side input selection switch provided between the terminals on the secondary side.

14. The power supply circuit according to claim 10, wherein the alternating-current coupling element is a transformer or a balun.

15. A power supply circuit comprising:
an alternating-current signal synthesis unit that synthesizes a plurality of input alternating-current signals to output the synthesized signal as an output alternating-current signal;
an AC/DC conversion circuit that converts the output alternating-current signal into a direct-current voltage signal; and
a control circuit that generates an input selection signal, the input selection signal specifying a combination of the input alternating-current signals to be synthesized so that the output alternating-current signal or the direct-current voltage signal becomes equal to or larger than a predetermined voltage that is set in advance, wherein the alternating-current signal synthesis unit synthesizes the input alternating-current signals to be synthesized specified by the input selection signal to output the output alternating-current signal, wherein the control circuit generates the input selection signal specifying the combination of the input alternating-current signals to be synthesized during an operation configuration processing stage which occurs before a normal operating state, and wherein the control circuit initially connects all of the plurality of input alternating-current signals during the operation configuration processing stage in order to obtain a DC voltage $V_{DC}$ resulting if all the input alternating-current signals are used.

16. The power supply circuit according to claim 15, wherein the control circuit then selects and connects one of the input alternating-current signals for comparison with the voltage $V_{DC}$.

17. The power supply circuit according to claim 16, wherein the control circuit sequentially connects one of the input alternating-current signals for comparison and retains the higher value voltage for subsequent comparisons with remaining input alternating-current signals.

* * * * *